United States Patent

[11] 3,562,515

| [72] | Inventor | Lloyd R. Oster<br>Erie, Pa. |
|---|---|---|
| [21] | Appl. No. | 824,490 |
| [22] | Filed | May 14, 1969 |
| [45] | Patented | Feb. 9, 1971 |
| [73] | Assignee | General Electric Company<br>a corporation of New York |

[54] TAPERED BRAKING RATE FOR TRACTION VEHICLES
13 Claims, 2 Drawing Figs.

| [52] | U.S. Cl. | 246/182 |
|---|---|---|
| [51] | Int. Cl. | B61l 3/08 |
| [50] | Field of Search | 246/182, 182B, 187 |

[56] References Cited

UNITED STATES PATENTS

| 3,034,096 | 5/1962 | Craddock | 73/489X |
|---|---|---|---|
| 3,041,449 | 6/1962 | Bingen | 246/182(B) |
| 3,245,728 | 4/1966 | Brooks | 246/182(B)X |
| 3,334,224 | 8/1967 | Allen et al. | 246/182(B)X |
| 3,457,403 | 7/1969 | Smith, Jr. | 246/187 |

Primary Examiner—Arthur L. La Point
Assistant Examiner—George H. Libman
Attorneys—Walter C. Bernkopf, Joseph B. Forman, Frank L. Neuhauser and Oscar B. Waddell ABSTRACT: An automatic speed control system for bringing a vehicle to a stop at a predetermined stopping point on its route of travel in accordance with a predetermined velocity-distance profile. A speed error signal for controlling the vehicle traction equipment results from a comparison of a signal representative of the square of vehicle velocity with a distance signal representative of vehicle distance to the stopping point. This distance signal is modified by subtracting therefrom a product signal which is a function of the product of the vehicle velocity and of the distance of the vehicle from the stopping point to provide for reduction of the vehicle velocity at a deceleration rate increasing linearly as an inverse function of velocity. When the vehicle attains a predetermined maximum deceleration rate, the product signal may be removed and the relative weighting of the compared velocity squared and target distance signals may be modified to permit continued vehicle deceleration at the maximum deceleration rate.

TAPERED BRAKING RATE FOR TRACTION VEHICLES

BACKGROUND OF THE INVENTION

This invention relates to automatic speed control systems for vehicles and relates particularly to systems for the generation of tapered braking rates of traction vehicles.

High speed traction vehicles, such as rapid transit cars, require careful control of propulsion and braking functions. Automatic control of these functions is being widely adopted for increased accuracy, safety of operation and passenger comfort. Automatic braking control systems have been developed for reducing the vehicle velocity with time in accordance with a preestablished stop trajectory or stopping profile. Control systems of this type, known as position stop control systems, are used for accurately stopping traction vehicles at passenger stations or other predesignated stopping points. The velocity of the vehicle or train is reduced as it approaches a station so that the vehicle or train ultimately stops properly aligned with the station platform.

In one form of such a position stop control system, the vehicle is controlled by means of vehicle-borne equipment to follow a specified velocity-distance trajectory in a position stop zone which extends from a known wayside reference point to the station stopping point. As the vehicle passes the wayside reference point, the position stop mode is actuated. Concurrently, a first signal is produced corresponding to the distance the vehicle should be from the stopping point based on the vehicle's actual velocity and the specified velocity-distance trajectory. Additionally, there is produced a second signal corresponding to actual target distance, i.e. the actual distance between the vehicle and the stopping point. These two signals are compared to provide an error signal which controls the deceleration of the vehicle.

The computation required to produce the error signal is based on the relationship between vehicle velocity, deceleration rate and actual target distance. The computation, and the circuitry required to perform the computation, is substantially simplified by the utilization of a constant deceleration rate. This permits utilization of the simple equation:

$v^2 = 2a(s_0 - s)$ where $v$ is vehicle velocity, $a$ is the constant deceleration rate, $s_0$ is the distance to the stopping point from which the constant deceleration is initiated, and $s$ is the distance the vehicle has traveled from the wayside reference point toward the stopping point. The term $(s_0 - s)$ represents the target distance $s_r$, the distance between the vehicle and the stopping point.

A position stop system utilizing such computation is described in U.S. Pat. No. 3,334,224, to R. K. Allen, which is assigned to the assignee of the subject application. This system utilizes a square function generator whose input signal corresponds to vehicle velocity, $v$, and is supplied by a tachometer. The square function generator provides at its output a signal corresponding to velocity squared, $v^2$, which is indicative of the distance the vehicle should be from the stopping point based on the vehicle's actual velocity and specified velocity-distance trajectory.

Additionally, an integrating circuit is utilized to produce a signal corresponding to actual target distance $s_r$. The integrating circuit has an initial charge corresponding to distance $s_0$. An input signal corresponding to vehicle velocity $v$ is applied to the integrating circuit coincident with the actuation of the position stop mode. The time integral of the velocity input signal corresponds to $\int v dt$, or $s$ and the integrator output corresponds to $s_0 - s$, which is the actual target distance $s_r$.

The outputs of the square function generator and of the integrator are applied, through an appropriate scaling arrangement, to a comparison circuit whose output, corresponding to the distance error signal, is applied to the vehicle traction equipment to achieve appropriate velocity correction of the vehicle.

The simplicity of the above-described position stop system is primarily due to utilization of a velocity-distance stopping profile based on a constant deceleration rate. Stopping a vehicle with a constant deceleration can, however, cause substantial operating difficulties.

In high speed traction vehicle operation it is most important to avoid wheel slide during deceleration. Wheel slide is encountered if braking torque exceeds available adhesion. Available adhesion diminishes substantially with increasing vehicle velocity. Avoidance of wheel slide, therefore, requires reducing the application of braking torque during high vehicle velocities. However, with the above-described position stop system a vehicle approaching the stopping zone, even at a high velocity, has programmed braking torque applied so as to reduce vehicle velocity at a constant rate regardless of the vehicle velocity.

The magnitude of braking torque applied at high velocities can be reduced by a corresponding reduction of the deceleration rate constant, i.e. lowering the magnitude of the constant velocity reduction per unit of time. This, however, requires substantially increasing the total stopping distance and increasing the distance of the position stop zone. This is unacceptable in high density traction systems in view of the associated increase in required headway between vehicles.

It is therefore desirable to provide for varying, or tapering, the deceleration rate of the vehicle. In addition it is extremely desirable to provide a tapering arrangement which does not utilize complex function generating or complex nonlinear circuits, and is thus readily subject to adjustment of taper in case the stop profile parameters or relevant traction vehicle parameters are modified.

It is, therefore, an object of this invention to provide an improved system for modifying the characteristics of a speed control system to provide a desired change of the rate of velocity variation over a predetermined interval.

It is a further object of this invention to provide an improved arrangement for tapering the velocity-distance profile of a braking control system whereby the deceleration rate may be varied linearly as an inverse function of vehicle velocity.

It is a further object of this invention to attain the aforesaid arrangement with a circuit incorporated in the brake control loop, which circuit is readily modified to accommodate various stopping profiles and vehicle parameters.

Briefly in accordance with one aspect of this invention, a control system is provided for varying the speed of a vehicle travelling between two predetermined displaced points in accordance with a predetermined velocity versus distance profile having a desired taper characteristic. A first signal is generated which is a function of the square of actual vehicle velocity, and a second signal is generated which is a function of actual distance between the vehicle and the one displaced point which the vehicle is approaching. Means are provided for modifying said second signal in response to a function of vehicle velocity to obtain a modified distance signal. The thus modified distance signal is compared with said first signal to obtain a signal adapted to control the vehicle traction effort in accordance with a velocity versus distance profile providing a variation of vehicle acceleration in accordance with the modification applied to the second signal. In one embodiment of the invention directed to a position stop system the second signal is varied by a quantity which varies as a function of velocity to provide for decelerating a vehicle with a deceleration rate ranging linearly as an inverse function of vehicle velocity.

The novel features believed characteristic of the invention are set forth with particularity in the appended claims. The invention itself, however, both as to its organization and method of operation, together with further objects and advantages thereof may best be understood by reference to the accompanying drawings.

It is frequently desirable to utilize a position stop system in conjunction with a speed regulation, or speed call, circuit of the type which provides traction control during normal operation of a traction vehicle. The position stop system and speed call circuit may utilize common components. For clarity of understanding, FIG. 1, therefore, additionally includes components of such a speed call circuit in order to illustrate how the position stop circuit may be integrated into the overall traction control system. Blocks illustrated in FIG. 1 which relate particularly to the speed call circuit are illustrated with dashed lines since the speed call circuit, per se, does not form an integral part of this invention.

Figure 1:
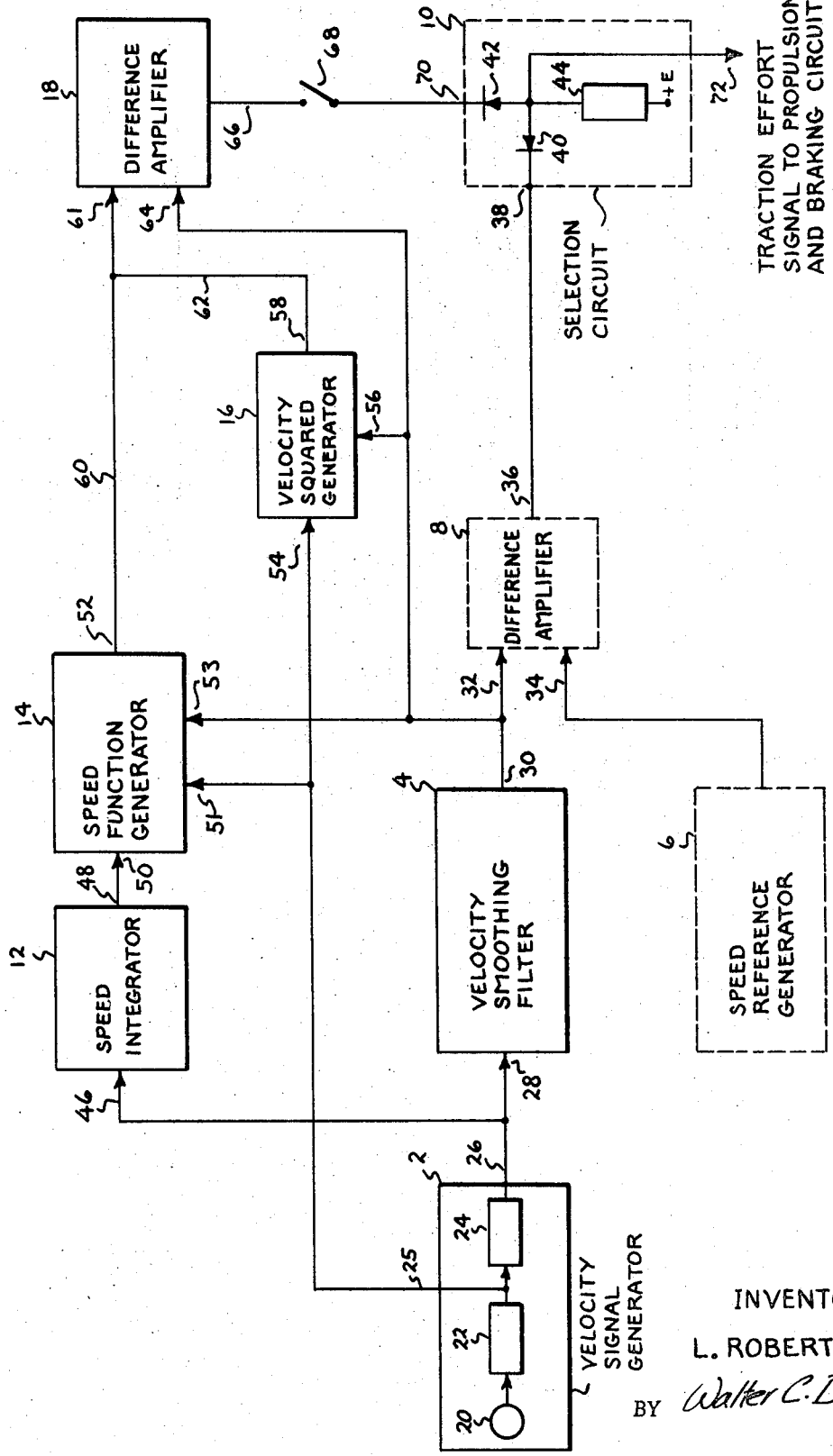
FIG. 1 is a block diagram of a speed regulation system which includes the invention.

For clarity of understanding, reference will initially be made, in connection with FIG 1, to components utilized in the speed call circuit. The speed of traction vehicles may be controlled from onboard or from wayside. In the case of automatic control systems it is necessary to compare the desired speed with the actual vehicle speed and from this comparison produce an error signal, termed herein a traction effort signal, which is applied to the vehicle propulsion and braking system in order to provide the desired traction characteristic. Velocity signal generator 2 provides an output signal which is proportional to the actual velocity of the traction vehicle. In the illustrated embodiment this signal appearing at output 26 comprises a train of pulses of equal time duration and equal amplitude. The rate of pulse occurrence is a direct function of the actual velocity of the vehicle. This signal is applied to the input 28 of velocity smoothing filter 4 which at its output 30 produces a DC signal having an amplitude proportional to the actual vehicle velocity. The desired vehicle velocity may be controlled either from aboard the vehicle or from the wayside. This may be achieved by various means, however, for the purpose of this explanation, a speed reference generator 6 is illustrated which provides a DC voltage signal whose amplitude is proportional to the desired vehicle velocity. The DC output signals from the velocity smoothing filter 4 and from the speed reference generator 6 are compared by difference amplifier 8 which produces an output, or torque call, signal. For purposes of illustration, it may be assumed that the signal appearing at output 30 of the velocity smoothing filter and applied to input 32 of difference amplifier 8 varies from 0 volts at zero actual speed to a negative voltage, such as minus 11 volts, at maximum speed. The output of speed reference generator 6, which is connected to input 34 of difference amplifier 8, may, for example, vary from 0 volts at zero desired speed to a negative voltage, such as 11 volts, at maximum desired speed. Under these conditions the output 36 of the difference amplifier will be 0 volts if the vehicle is traveling at the exact desired speed. In the case of underspeed, the output will vary from 0 to plus 11 volts, where plus 11 volts indicates a call for full propulsion. In the case of overspeed, the signal at output 36 will vary from 0 to minus 11 volts, where minus 11 volts indicates a call for full braking. This explanation is slightly simplified since in actual practice there will have to be a slight offset in the signals applied to the difference amplifier in order to provide an appropriate torque call signal.

The speed reference and actual velocity signals are applied to the difference amplifier 8 in a subtractive sense so that the output at 36 corresponds to the difference between the velocity signal at input 32, and the speed reference signal at input 34 increased, however, by the gain of the reference amplifier. There is sign reversal produced from the input 34, but not from the input 32, of the difference amplifier 8. Thus, for example, if the actual velocity is in excess of the referenced speed, the negative signal at 32 is in excess of that applied to input 34 with the output signal at 36 being negative, and vice versa.

The difference amplifier output 36 is coupled to one input, 38, of selection circuit 10 whose other input 70 is connected to the output of the position stop system. The function of the selection circuit 10 is to provide at its output 72 the most negative one of the signals appearing at inputs 38 and 70, and therefore to select the most restrictive speed signal. This may be achieved as diagrammatically indicated by connecting diodes 40 and 42, respectively from the inputs 38 and 70 to a positive current source and to the output terminal 72. For the described conditions the cathodes of the diodes are connected to the inputs and the anodes are connected to the output 72. A current source 44 is connected to the output 72 to make output 72 clamp to the most negative one of the inputs applied to inputs 38 or 70.

The position stop system includes velocity squared generator 16, speed integrator 12, speed function generator 14 and comparison circuit, or difference amplifier, 18. These components are provided with signals responsive of vehicle velocity from the previously described velocity signal generator 2 and velocity smoothing filter 4. The velocity squared generator provides an output signal which is a function of the square of the vehicle velocity. The speed integrator 12 produces an output signal which represents a function of the target distance $s_r$, i.e. the actual distance of the vehicle to the preselected stopping point. If these output signals are appropriately compared, such as by application to comparison circuit 18, a control signal is obtained which by application to the vehicle traction circuits causes the vehicle velocity to decrease in accordance with a predetermined velocity-distance profile. The vehicle will be automatically slowed at a constant deceleration rate until it stops at the predesignated stopping point. Such an arrangement is predicted on satisfying the equation $v^2 = 2a\, s_r$ where $a$ is a constant deceleration rate. Position stop operation at a constant deceleration rate, however, is not satisfactory, and an arrangement is desired which provides a tapered deceleration wherein deceleration is increased with decreases in vehicle velocity. Preferably the deceleration rate is caused to increase linearly as an inverse function of velocity between a first velocity and a second, reduced, velocity. The target distance signal $s_r$ provided by the output of the speed integrator is accordingly modified in speed function generator 14 by a quantity varying with velocity. The output of the speed function generator 14, representing the modified distance signal $s'$ is then compared by comparison circuit 18 to the velocity squared signal from $v^2$ generator 16 so as to provide an error signal based on a position stop profile, or velocity distance trajectory, having the desired change in deceleration rate.

Reference is again directed to FIG. 1 for a description of the position stop system, which utilizes the previously described velocity signal generator 2 and velocity smoothing filter 4. The velocity signal generator may, for example, utilize AC tachometers 20 providing an AC output signal, whose frequency is a function of vehicle velocity, to a ringing pulse generator 22 which provides a pulse of fixed time duration for every half-cycle of the AC waveform supplied by the tachometers. These pulses may be applied to a chopper 24 whose output consists of a train of pulses which are coincident in time and pulse width with those provided by the ringing pulse generator but which are also of predetermined pulse amplitude. The output 26 of the velocity signal generator 2 is coupled to input 46 of speed integrator 12, which performs a function similar to that of the integrating circuit disclosed in the Allen patent. The speed integrator has an initial charge corresponding to the distance $s_o$, the distance from the wayside reference point, at which the position stop system is actuated, to the desired stopping point. The input signal at 46 comprises uniform pulses occurring at a rate corresponding to the tachometer output and thus corresponding to velocity $v$. This input signal is applied to the integrating circuit commencing coincident with the actuation of the position stop mode upon the vehicle passing the wayside reference point. The applied pulses decrease the amplitude of the integrator output as a function of the pulse rate, so that the signal at output 48 of the speed integrator decreases from its initial level as a function of the time integral of vehicle velocity. The signal at output 48 therefore corresponds to the actual target distance $s_r$.

In accordance with the invention, this signal is further modified by speed function generator 14. The speed integrator output signal, i.e. the target distance signal $s_r$, is applied to input 50 of the speed function generator 14 and is modified therein to produce a modified speed signal $s'$ which provides for the desired tapered rate characteristic whereby the deceleration rate is increased as vehicle velocity decreases. Preferably the deceleration rate is increased linearly with decreasing velocity over a predetermined velocity range. Essentially, this is achieved by multiplying the actual target distance signal $s_r$ by a quantity varying as a function of velocity. For this purpose a velocity responsive signal is applied from velocity signal generator 2 to a second input 51 of generator 14. As illustrated in FIG. 1, the signal may be derived from the output of ringing pulse generator 22 and applied to input 51 by conductor 25. Accordingly, there is produced in the speed function generator a product signal which corresponds to a function of the product of the target distance signal and the velocity signal. This product signal is algebraically added to a signal which is a function of target distance to produce the modified target distance signal $s'$. An additional velocity responsive signal may be applied from velocity smoothing filter 4 to a third input 53 of the speed function generator. This signal is applied for open loop brake rate purposes, which are discussed subsequently. The modified speed signal $s'$ is applied by line 60 from the speed function generator output 52 to input 61 of comparison circuit 18.

Velocity squared, or $v^2$, generator 16 provides at its output 58 a velocity squared signal which is proportional to the square of instantaneous vehicle velocity, $v^2$. In the illustrated embodiment this output signal is obtained by effectively multiplying two velocity responsive signals. For this purpose the pulse train from the velocity signal generator is applied, in the case of the illustrated embodiment, through conductor 25, to one input 54, and the output of velocity smoothing filter 4 is applied to another input 56 of the velocity squared generator. The velocity squared signal is applied, by line 62 to input 61 of the difference amplifier 18.

The comparison circuit 18 compares the $v^2$ and $s'$ signals applied by conductors 60 and 62 and provides a signal at output 66 which calls for increased braking whenever the actual vehicle velocity is in excess of that required by the desired speed-velocity profile and for increased torque when velocity is below that required by the profile. It is desirable to superimpose the error signal, i.e. the difference between the $v^2$ and $s$ signals on an open loop speed signal. Accordingly, the signal from the velocity smoothing filter is applied to a second input 64 of the difference amplifier. The error signal thus acts as a modulating corrective signal about the reference level established by the open loop speed signal.

The speed error signal output 66 of the comparison circuit may be applied directly to the vehicle traction control system to control braking and propulsion, i.e. the tractive effort of the vehicle. In the illustrated embodiment, the output 66 provides the speed error signal through switch 68 to input 70 of the previously described selection circuit 10. The switch 68 is closed during actuation of the position stop mode. In the described embodiment the selection circuit 10 couples the most restrictive signal applied by either the position stop system or the speed call circuit to the vehicle traction control system.

Figure 2:
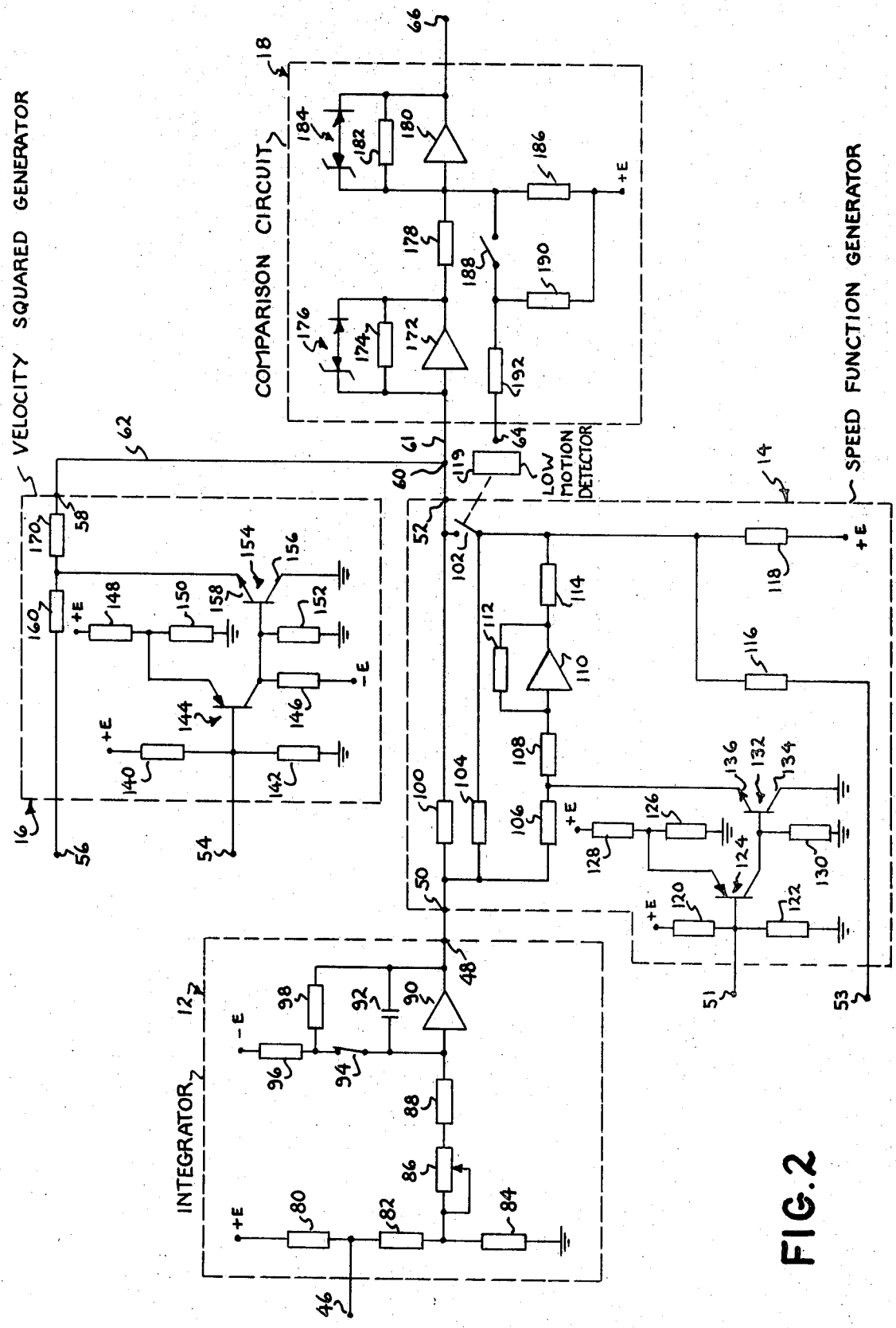
FIG. 2 is a schematic diagram of the speed control system providing a desired change of the rate of velocity variation in accordance with the invention.

Reference will now be made to FIG. 2 in order to discuss the circuitry of the position stop system. FIG. 2 illustrates in schematic form the components 12, 14, 16 and 18 illustrated in the FIG. 1 block diagram. The integrator 12 provides at its output 48 a signal whose voltage varies proportionately with the target distance $s_r$, the distance from the vehicle to the stopping point. The illustrated integrating circuit comprises a conventional operational amplifier 90 having an integrating capacitor 92 connected between its input and output terminals. The output 48 of the operational amplifier is also connected through resistors 98 and 96 to a source of negative potential. In addition, a switch 94 is connected from the junction of resistors 96 and 98 to the input of the operational amplifier. This switch is normally closed until the vehicle passes the wayside reference point whereupon it is opened upon initiation of the position stop mode. While the switch is closed, a predetermined potential is, therefore, applied to the input of the operational amplifier to initially charge capacitor 92 so as to produce a predetermined potential at output 48 corresponding to $s_o$, the distance from the point at which the position stop mode is initiated to the actual stopping point of the vehicle. For purposes of example, this initial voltage may be selected to be +10 volts. The output signal from the velocity signal generator 2, comprising positive pulses occurring at a rate proportional to instantaneous vehicle velocity, is applied to input 46 of the speed integrator. Input terminal 46 is connected to the junction of resistors 80 and 82 which form a portion of a voltage divider network, comprising resistors 80, 82 and 84, which is connected between a source of positive potential and ground. The velocity signal output is applied from the junction of resistors 82 and 84 through the serially connected adjustable resistor 86 and input resistor 88 to the input of the operational amplifier 90.

When the vehicle passes the designated wayside reference point, switch 94 opens initiating the integration action. The output signal at 48 is subsequently decreased as a function of the time integral of the velocity signal input to the operational amplifier. The time integral of the velocity signal represents the distance traveled by the vehicle from the wayside reference point and the output signal at terminal 48 represents $$s_o - \int vdt = s_r,$$

the target distance which is the computed distance remaining between the vehicle and the stopping point. For purposes of example, the output signal at 48 may be +10 volts at the initiation of the position stop mode and may be made to decrease linearly in a negative direction with distance traveled at the rate of one volt for 250 feet of travel until the desired stopping point is reached. The initiation voltage can be modified for trains of different lengths if it is desired to stop the center of the train at a predetermined stopping point.

Target distance signal $s_r$ is connected from output 48 of the integrator to input 50 of the speed function generator. Input 50 is connected by resistor 100 to output 52, which is coupled to the input of comparison circuit 18. The described arrangement provides for coupling the target distance signal $s_r$ to the comparison circuit for comparison with the output of the velocity squared generator so as to provide an error signal based on a velocity-distance profile having a constant deceleration rate. The purpose of the speed function generator, however, is to convert the $s_r$ signal so that a modified distance signal $s'$ is coupled from output 52 to the difference amplifier to provide an error signal based on a tapered deceleration rate profile. This is achieved by coupling an additional network to output 52 by closure of switch 102. The network contains a first circuit including serially connected resistors 106 and 108, operational amplifier 110 with its feedback resistor 112 and resistor 114. A subsequently described chopper circuit is connected to the junction of resistors 106 and 108. A second circuit comprising resistor 104 is connected in parallel with the first circuit The junction of resistors 106 and 104 is circuit. to input terminal 50 and the junction of resistors 114 and 104 is connected to one terminal of switch 102. The other terminal of switch 102 is connected to output terminal 52. The normally closed switch 102 thus effectively connects the network in parallel with resistor 100.

Input 51 of the speed function generator is connected to a shunt chopping circuit comprising transistors 124 and 132. Input 51 is connected to the base of PNP transistor 124. This base is additionally connected to the junction of resistors 122 and 120 which are respectively connected to ground and a source of positive potential. The emitter is connected to the junction of resistors 126 and 128, which are respectively connected to ground and a source of positive potential. The collector of device 124 is connected to the base of NPN transistor 132, whose collector is grounded and whose base is additionally connected to ground through resistor 130. The emitter of device 132 is connected to the junction of previously referenced resistors 106 and 108.

A train of positive pulses whose repetition rate is a function of vehicle velocity is applied to the input 51 of the chopper. During the absence of pulses device 124 is cut off and during the presence of an applied pulse device 124 conducts and accordingly causes conducting device 132 to cut off. Accordingly, the junction of resistors 106 and 108 is normally shunted by a very low impedance. This shunting is removed during the presence of pulses and the removal of shunting occurs at a rate which is a function of vehicle velocity. The collector-emitter path of device 132 thus constitutes a variable impedance which normally shunts the input circuit of the operational amplifier 110 with a low impedance but during applications of pulses constitutes a high impedance. Accordingly, the signal appearing at the junction of resistors 106 and 108 comprises pulses whose amplitude is a function of the target distance signal and whose recurrent rate is a function of velocity. This product signal has an average amplitude corresponding to the product of the target distance $s_r$ and the velocity $v$. Resistors 106 and 108 are utilized to prevent this low impedance from excessively shunting the integrator circuit and operational amplifier 110.

As previously stated, the position stop system with switch 102 open provides an error, or control signal, which when applied to the vehicle traction equipment decelerates the vehicle at a constant deceleration rate. Comparison of the velocity squared signal and of the target distance $s_r$ by the comparison circuit 18 results in an output signal which is a function of $v^2 - 2as_r$, where $a$ is a constant deceleration rate, such as for example 2.75 m.p.h. per second. It is desirable, however, to decelerate the vehicle on a velocity-distance profile having a deceleration rate varying as an inverse function of velocity. Preferably the deceleration rate should increase linearly as the vehicle decelerates between two predetermined velocities. For example, the vehicle may have a deceleration rate increasing substantially linearly from 1.95 m.p.h. per second at a velocity of 75 m.p.h. to 2.75 m.p.h. per second at a velocity of 40 m.p.h.

With switch 102 in the open position the position stop circuit will provide for vehicle deceleration at a predetermined deceleration rate $a'$. This rate in the previously stated example is 2.75 m.p.h. per second. It is now desired to initiate deceleration at a lower rate, such as 1.95 m.p.h. per second, and to increase this deceleration rate until the vehicle reaches the $a'$ rate at a given velocity. This is achieved by applying a reduced distance signal to the input of the comparison circuit comprising the difference between a properly weighted target distance signal and a product signal which is a function of the product of the target distance signal and the velocity signal. The product signal corresponds to $s_r (v/C)$, where C is a constant. Thus, at high vehicle speeds the reduced distance signal will be substantially reduced in respect to the target distance signal $s_r$. Comparison of this reduced distance signal with the velocity squared signal will result in initiation of braking action at a target distance greater than that at which braking would otherwise have been initiated. Braking will also be initiated at a substantially reduced deceleration rate. Since the product signal $s_r (v/C)$ is reduced as a function of velocity, the reduced target distance signal approaches the target distance signal $s_r$ and the deceleration rate increases toward the predetermined deceleration rate $a'$ with decreasing vehicle velocity.

The above described function is achieved by the series circuit comprising components 106, 108, 110 and 112 and the chopper. The circuit including resistors 106 and 108 and the chopper constitutes a multiplying arrangement providing at the junction of resistors 106 and 108 a product signal which is a function of the product of the target distance signal and the velocity signal. The signal appearing at the junction of resistors 106 and 108 consists of pulses whose repetition rate is a function of vehicle velocity and whose amplitude is a function of the target distance signal $s_r$. This signal, therefore, has an average value corresponding to the product of the target distance $s_r$ and velocity $v$. This signal is appropriately amplified by operational amplifier 110 which because of its inherent sign reversal produces at its output a signal which is of opposite polarity to that appearing at input terminal 50. The algebraic addition at the comparison circuit 18 of this signal to the target distance signal supplied through resistor 100 provides the aforementioned reduced t target signal which corresponds to $s_r (1 - v/C)$.

It is highly desirable to retard the vehicle at a deceleration rate which increases linearly as an inverse function of vehicle velocity. This can be achieved by properly weighting the target distance signal applied to the comparison circuit, such as by an appropriate value of resistance 100.

As previously stated, it is desirable to retard the vehicle with an increasing deceleration rate until a predetermined maximum deceleration rate is attained and to then continue deceleration at this predetermined deceleration rate. Deceleration at such constant deceleration rate is attained upon opening switch 102. The desired predetermined deceleration rate is attained by appropriate weighting of the velocity squared and target distance signals applied to the comparison circuit 18. This requires selection of an appropriate value for resistor 100.

However, retardation of the vehicle at a deceleration rate which increases linearly as an inverse function of velocity requires different weighting or modification of the target distance signal applied to the comparison circuit. This can be achieved by modifying the target distance signal $s_r$ so that a modified distance signal $s'$ is applied to the comparison circuit which is equal to: $s_r (1 + B - v/C)$ where B is a constant, and $-v/C$ is the previously discussed product signal. Accordingly, an additional signal $s_r (B)$ is added to the comparison circuit during closure of switch 102. This signal is provided by resistor 104.

The following description relates to the selection of appropriate components in the network of the speed function generator in order to provide a modified distance signal $s'$.

Equation 1 represents the basic deceleration equation for a constant deceleration rate:

(1) $$v^2 = \frac{15}{11} a_1 s_r$$

where $v$ = vehicle velocity in miles per hour
$s_r$ = target distance in feet
$a_1$ = constant deceleration rate in miles per hour per second Substituting the modified distance $s'$ for $s_r$:

(2) $$s_r\left(1+B-\frac{v}{C}\right) = \frac{11}{15}\frac{1}{a_1}v^2$$

solving for $s_r$:

(3) $$s_r = \frac{C}{a_1}\frac{11}{15}\frac{v^2}{C+BC-v}$$

Equation (3) represents an equation of $s_r$ and $v$ and a constant acceleration. Usually, the initially defined parameters for a tapered deceleration rate system include a stated first deceleration rate at a first velocity (such as 1.95 m.p.h./sec at 75 m.p.h.) and a stated second, higher deceleration rate at a second, lower, velocity (such as 2.75 m.p.h./sec at 40 m.p.h.). For this reason it is desirable to derive an equation of actual (varying) deceleration and velocity:

(4) $$a = \frac{dv}{dt} = \left(\frac{22}{15}\right)v\frac{dv}{ds}$$

Differentiating equation (3):

(5) $$\frac{ds}{dv} = \frac{C}{a_1}\frac{11}{15}\frac{v}{C+BC-v}\left(2+\frac{v}{C+BC-v}\right)$$

and substituting equation (5) in equation (4):

$$a = \frac{2a_1}{C} \frac{(C+BC-v)^2}{2(C+BC)-v} \quad (6)$$

where $a_1$ is the final or maximum deceleration rate, which for the previously stated example is 2.75 m.p.h./sec.

The constants B and C can now be derived by substituting the two stated deceleration rate-velocity conditions in equation (6). Solving equation (6) for the previously stated examples of 2.75 m.p.h./sec at 75 m.p.h. and 1.95 m.p.h./sec at 40 m.p.h.:

$$2.75 = \frac{2(2.75)}{C} \frac{(C+BC-40)^2}{2(C+BC-40)} \quad (7)$$

$$1.95 = \frac{2(2.75)}{C} \frac{(C+BC-75)^2}{2(C+BC-75)} \quad (8)$$

For the above examples $C = 162$ and $B = .358$. Having derived constants B and C, the magnitude of the network components can be determined. For example: Resistance $104 = \frac{\text{Resistance } 100}{B}$.

The component values of the circuit including components 106, 108, 110, 112 and 114 can also be readily determined. The $\frac{-s_T v}{C}$ signal appears at the junction of operational amplifier 110 and resistor 114. Resistor 114, an input resistance for the difference amplifier 18, may for convenience be made equal in value to resistor 100. The appropriate gain for the operational amplifier is obtained by matching the magnitude of feedback resistor 112 to the value of resistors 106 and 108 and the duty factor of the chopper. The duty factor is defined as the percentage of time during which the chopper is cut off at a preselected vehicle speed divided by that speed. The resistance of resistor 112 may thus equal the sum of resistors 106 and 108 divided by the product of constant C and the duty factor.

The function generator provides for an increasing deceleration rate. For some applications it may be adequate to increase the deceleration rate until the vehicle is closely adjacent to the stopping point at which point the retardation is decreased by conventional means until the stopping point is reached. Usually, however, a maximum deceleration rate is reached prior to the vehicle reaching the stopping point. The maximum deceleration rate is determined by vehicle parameters including the saturation point of the braking system and the relationships between braking torque and available adhesion. It is therefore desirable to increase the deceleration rate to such a maximum rate and to subsequently continue the deceleration at a constant rate. Accordingly, the deceleration rate may be increased to the rate obtained with an unmodified target distance signal $s_T$ and switch 102 opened when this rate is attained. Since such maximum deceleration rate is reached at a predetermined velocity, the switch may be opened when the vehicle speed has decreased to such velocity. For this purpose a low motion detector 119 may be utilized. Such detectors are well known in the art and may, for example, utilize a comparison circuit and a DC reference circuit, whose output voltage corresponds to the velocity at which switch 102 is to be opened. The comparison circuit may compare the output of the velocity smoothing filter with the reference output voltage so that switch 102 is actuated when the output of the smoothing filter decreases to the level of the reference voltage.

Occasionally, the integrator 12 may be designed to provide an output which varies from one polarity to an opposite polarity as the target distance signal is reduced. For example, the integrator 12 output applied to input 50 of the speed function generator might vary from plus 10 volts at the initiation of the position stop mode to a negative voltage when the vehicle reaches the stopping point. It is therefore convenient to apply an offset voltage which assures that the output signal of the speed function generator will always be of one polarity. This is achieved by applying a positive potential through resistor 118 to the junction of switch 102 and resistor 114.

In addition, it is desirable during closure of switch 102 to add a DC voltage varying as a function of velocity to the input of the difference amplifier. This is achieved by applying the velocity smoothing filter signal from input 53 through resistor 116 to the junction of resistor 114 and switch 102. The variable DC voltage is an open loop signal which reduces the band width requirements imposed on the position stop system control loop.

Various changes, modifications and substitutions may be made in the embodiment described herein without departing from the true scope and spirit of the invention as defined in the appended claims.

The following discussion relates to the $v^2$ generator which provides at its output 58 a signal corresponding to the square of the actual vehicle velocity. Input 56 is supplied from smoothing filter 4 with a DC signal whose amplitude increases in a negative direction as a function of actual vehicle speed. This signal is coupled through two serially connected resistors, 160 and 170, to output terminal 58. A second signal varying as a function of velocity is applied to input terminal 54 of the $v^2$ generator. This signal produced by the velocity signal generator 2 consists of a train of uniform width positive pulses whose repetition rate is a function of the vehicle velocity. Input 54 is connected to a shunt chopping circuit comprising transistors 144 and 154. This chopper operates similarly to that previously described in reference to the speed function generator. Input 54 is connected to the base of PNP transistor 144 whose collector is coupled through a resistor 146 to a source of negative potential and whose emitter is connected to the junction of resistors 148 and 150 which are respectively connected from a source of positive potential to ground. The base of device 144 is additionally connected to a source of positive potential by being connected to the junction of resistors 140 and 142 which are connected, respectively, to a source of positive potential and ground. The collector of device 144 is applied to the base of NPN transistor 154 whose collector 156 is grounded and whose emitter 158 is connected to the junction of the resistors 160 and 170. An input resistor 152 is connected from the base of device 154 to ground.

In operation, device 144 is normally conducting because of the positive voltage applied to the emitter in respect to the base. Device 154 is normally cut off. upon the application of positive pulses to input terminal 54, device 144 cuts off. This in turn causes normally conducting device 154 to cut off. Device 154 is thus cut off only during the occurrence of pulses and otherwise grounds the junction between resistors 160 and 170. These resistors may be of equal value and are utilized to prevent the chopper from loading down the circuits connected to input 56 and output 58. The velocity signal applied to terminal 56 from the output of the velocity smoothing filter is thus coupled to the output 58 only during the occurrence of pulses applied to input terminal 54 from the velocity signal generator. Since chopping occurs at a rate proportional to velocity, the resulting signal at the junction of resistors 160 and 170 has an average voltage and the signal at output 58 of the $v^2$ generator has an average current value which is proportional the square of instantaneous vehicle velocity.

The velocity squared signal from output 58 and the distance signal from output 52 of the speed function generator are coupled by lines 62 and 61 to input 61 of difference amplifier 18. The two above referenced signals are applied to the input of a first operational amplifier 172 having a conventional feedback resistor 174 connected between its input and output and having the zener diode circuit 176 also connected thereacross in order to prevent saturation of the operational amplifier. The resistors in the output paths of the $v^2$ generator and speed function generator act as input impedances for the operational amplifier. The output of operational amplifier 172 will vary in response to the error, or difference, signal generated by the comparison of the $v^2$ and speed function signals. Thus, if for example the $v^2$ signal on line 62 exceeds the speed function generator signal on line 60, a negative error signal is generated at the input of operational amplifier 172 and a positive error signal is generated at the output thereof. This positive signal is indicative of the need for additional retardation or braking. Conversely, if the speed function generator signal exceeds the $v^2$ generator output signal, the output of operational amplifier 172 is negative indicating that the instantaneous vehicle velocity is less than the velocity calculated in accordance with the velocity-distance profile, and is thus indicative of the desirability of applying less braking energy to the vehicle. The output of operational amplifier 172 is applied through input resistor 178 to operational amplifier 180 which has feedback resistor 182 and zener diode network 184 connected in parallel across its input and output. The output of the operational amplifier 180 appears at output terminal 66 of difference amplifier 18. For the previously described conditions, this output will be zero if the actual vehicle velocity corresponds to the programmed velocity, negative if the actual velocity is excessive and braking is required and positive if the actual velocity is less than the programmed velocity. The output terminal 60 may be coupled to the vehicle traction circuits as previously described in connection with the explanation of FIG. 1.

Operational amplifier 180 comprises a summing amplifier which adds an open loop brake signal to the error signal output of amplifier 172. For this purpose there is provided a network comprising resistors 186, 190 and 192 and switch 188. Resistor 186 is connected between a source of positive potential and the junction between resistor 178 and the input of the operational amplifier 180. In addition, the output of the velocity smoothing filter 4 is applied to terminal 64 which is connected by serially-connected resistors 192 and 190 to the above-referenced source of positive potential. A switch 188 is connected between the junction of resistors 192 and 190 and the junction of resistors 186 and 178. This network provides an open loop feed signal of a preselected level of braking effort even in the absence of the error signal provided by operational amplifier 172. When the speed function generator output corresponds to the unmodified $s_r$ signal, i.e., when switch 102 of the speed function generator is open, switch 188 is also open. THerefore, a constant potential is applied whenever the system operates so as to produce a constant deceleration rate. However, when the speed function generator is actuated by the closing of switch 102 so as to modify the output signal of integrator 12 in order to attain a varying deceleration, switch 188 is closed so as to vary the open loop signal in response to the output of the velocity smoothing filter. The application of the open loop braking signal provides a preselected level of braking effort and thus permits a reduction in the magnitude of the error signal.

I claim:

1. An automatic control system for changing the speed of a vehicle over a predetermined distance of travel along its route from its existing velocity to a predetermined velocity in accordance with a velocity-distance profile providing for a variation of vehicle deceleration over at least a portion of said distance, comprising:
   a. a source of velocity squared signals responsive to the square of actual vehicle velocity;
   b. a source of target distance signals responsive to the distance of said vehicle from a predetermined point on the route;
   c. a comparison circuit having an input coupled to said aforesaid sources and an output providing a speed error signal adapted to control vehicle traction;
   d. a source of velocity signals responsive to actual vehicle velocity; and
   e. a network having first and second inputs coupled, respectively, to said sources of target distance signals and velocity signals and comprising multiplying means to produce a product signal varying as a function of the product of said target distance and velocity signals and means for algebraically adding said product signal to the input of said comparison circuit in conjunction with said target distance and velocity squared signals.

2. The automatic control system of claim 1 wherein said multiplying means comprises means for shunting said target distance signal with a low impedance at a rate related to the actual vehicle velocity to provide a product signal comprising a pulse train having a pulse recurrence rate proportional to the actual vehicle velocity and a pulse amplitude proportional to the target distance.

3. The automatic control system of claim 1 having means for removing said product signal from the input of said comparison circuit upon the vehicle attaining a predetermined rate of acceleration.

4. The automatic control of claim 1 wherein said velocity signals are coupled to said comparison circuit for open loop control during application of said product signal to said comparison circuit.

5. An automatic position stop control system for stopping a traction vehicle at a predetermined point along its route in accordance with a velocity-distance profile wherein the rate of vehicle deceleration varies as an inverse function of velocity, comprising:
   a. a source of velocity squared signals responsive to the square of actual vehicle velocity;
   b. a source of target distance signals responsive to the distance of said vehicle from said predetermined stopping point;
   c. a comparison circuit having an input coupled to both of the aforesaid sources, and an output providing a speed error signal to control the tractive effort of said vehicle;
   d. a source of velocity signals responsive to actual vehicle velocity;
   e. means coupled to said source of target distance signals and said source of velocity signals to produce a product signal varying as a function of the product of said target distance and velocity signals; and
   f. means to apply said product signal to the input of said comparison circuit in a subtractive manner in respect to said target distance signal.

6. The automatic position stop control system of claim 5 wherein said multiplying means comprises a means for shunting said target distance signal at a rate inversely proportional to the actual vehicle velocity to provide a product signal comprising a pulse train having a pulse recurrence rate proportional to the actual vehicle velocity and a pulse amplitude proportional to the target distance.

7. The position stop control system of claim 5 wherein said product signal is disconnected from the input of said comparison circuit upon the vehicle velocity attaining a predetermined deceleration rate.

8. The position stop control system of claim 7 wherein the relative weighting of the target distance signals and the velocity squared signals is modified concurrently with the disconnection of said product signal to provide thereafter for further vehicle deceleration at said predetermined rate.

9. THe position stop control system of claim 8 wherein a velocity responsive detector is actuated when the vehicle attains a velocity corresponding to said predetermined deceleration rate to disconnect said product signal and modify the respective weighting of the target distance and velocity squared signals.

10. An automatic position stop system for stopping a traction vehicle at a predetermined stopping point along its route in accordance with a predetermined velocity distance profile comprising:
   a. an operational amplifier comparison circuit having an input and an output, said output providing a speed-error signal adapted to control the tractive effort of said vehicle;
   b. a source of velocity squared signals responsive to the square of actual vehicle velocity, said source being impedance coupled to the input of said comparison circuit;

c. a source of target distance signals responsive to the distance of said vehicle from said predetermined stopping point;
d. first impedance means coupled from said source of target distance signals to the input of said comparison circuit;
e. a second impedance, an operational amplifier having its input coupled to said source of target distance signals and its output serially connected through said second impedance to the input of said comparison circuit;
f. variable impedance means connected in shunt across the input of said operational amplifier, said impedance means controllably providing a high impedance and a low impedance path; and
g. control means responsive to the vehicle velocity to vary the time ratio between the occurrence of said high impedance path and said low impedance path.

11. The automatic position stop system of claim 10 wherein said variable impedance is normally in a low impedance state, and said control means are responsive to a train of pulses having a pulse recurrence rate proportional to vehicle velocity to change the state of said variable impedance to a low impedance state during the occurrence of each pulse.

12. The automatic position stop system of claim 11 wherein third and fourth impedances are serially connected intermediate said source of target distance signals and the input of said operational amplifier and said variable impedance is connected to the junction of said third and fourth impedances.

13. The automatic position stop system of claim 12 wherein a fifth impedance is connected in parallel with said series circuit and switching means are provided for disconnecting the combination of said fifth impedance and said series circuit from the input of said comparison circuit upon the vehicle attaining a predetermined rate of deceleration.